Jan. 26, 1932. T. J. BRACKETT 1,842,743

ROAD MAP HOLDER

Filed July 6, 1931

Inventor
Thos. J. Brackett.
By Albert B Dietrich
Attorney

Patented Jan. 26, 1932

1,842,743

UNITED STATES PATENT OFFICE

THOMAS JAMES BRACKETT, OF GREENLAND, NEW HAMPSHIRE

ROAD MAP HOLDER

Application filed July 6, 1931. Serial No. 549,073.

My invention relates to certain new and useful improvements in devices for holding road maps or other similarly shaped articles in position where the may can be easily read and where it will not interfere with the driver's vision or his control of the machine.

Further, the invention has for its object to provide a holder made of music wire or spring wire formed to snap onto one of the spokes of the steering wheel and provided with clips into which the may may be slid.

Further, it is an object to provide a holder in which any road map folded to expose the portion desired, may be conveniently held on the steering wheel in constant view of the driver.

Further, the invention has for an object to provide a holder which may be used for gift advertising to hold advertising cards or other articles on a suitable support which may be the spokes of a steering wheel or any other similar structure to which the device could be clipped.

Other objects will in part be obvious and in part be pointed out hereinafter.

To the attainment of the aforesaid objects and ends, the invention still further resides in the novel details of construction, combination and arrangement of parts, all of which will be first fully described in the following detailed description, then be particularly pointed out in the appended claims, reference being had to the accompanying drawings, in which:

In the drawings in which like numerals of reference indicate like parts in all of the figures, 1 represents the support which, in the instance illustrated, is the spoke of a steering wheel.

Figure 1:
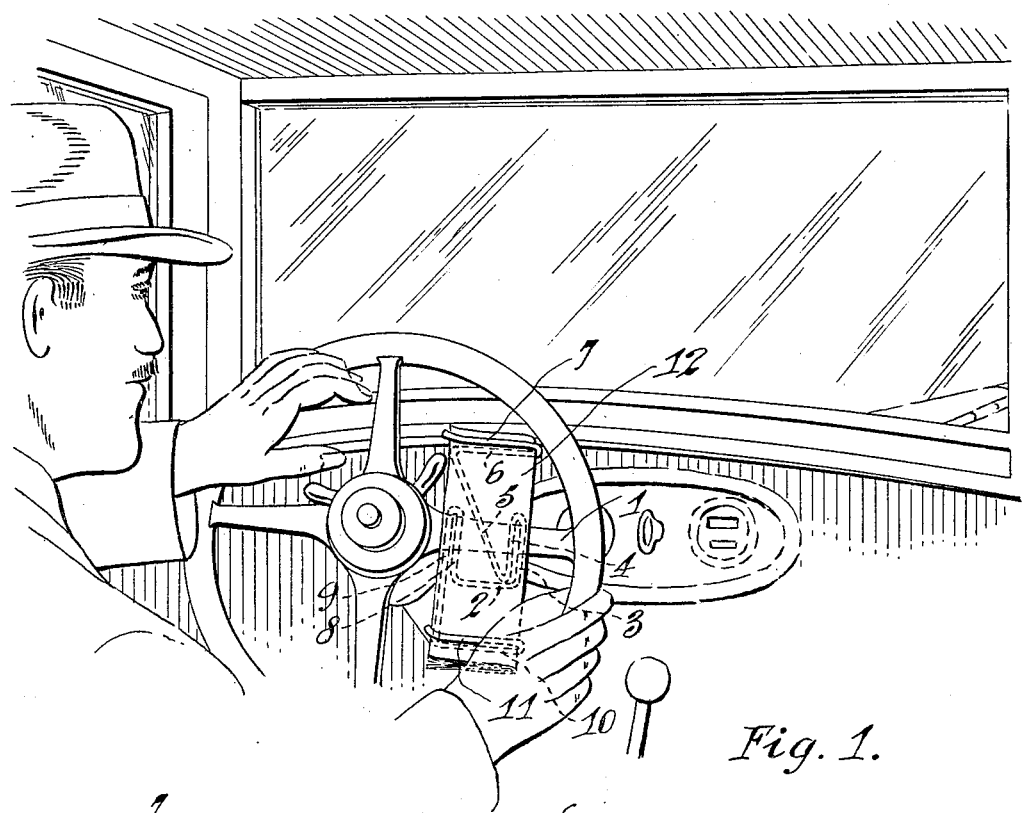
Figure 1 is a perspective view showing my invention applied to the spoke of an automobile steering wheel.
Figure 2:
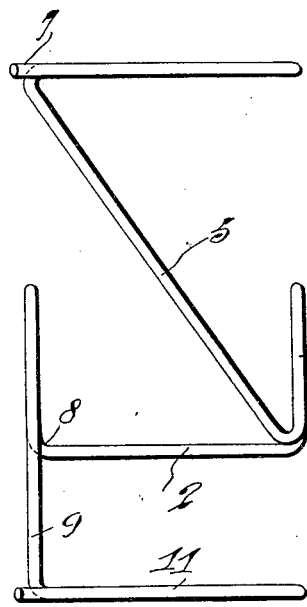
Figure 2 is an elevation of the device per se.
Figure 3:
Figure 3 is a side view of the device shown in Figure 2.
Figure 4:
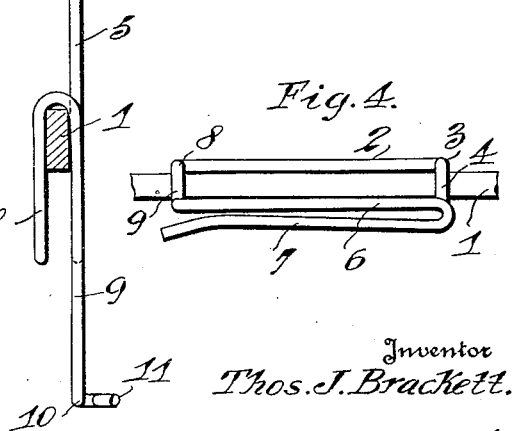
Figure 4 is a top plan view of the same, the spoke being indicated in both Figures 3 and 4.

The device which comprises my invention consists of a resilient or spring wire bent intermediate its ends to comprise two U-shaped clips as at 3, 4 and 8, 9. The part 4 is again bent diagonally as at 5 and the upper end of the wire is bent transversely and back upon itself as at 6 and 7 to constitute the upper map holding clip. The portion of the wire 9 is also bent laterally as at 10 and back upon itself as at 11 to constitute the lower map holding clip. The clips 3, 4 and 8, 9 lie vertically in parallel planes while the clips 6, 7 and 10, 11 lie transversely in parallel planes in the embodiment of the invention illustrated, and the connecting parts between the several clips, 2, 5 and 9, lie in a plane normal to the planes containing the several clips. The intermediate clips serve as means for mounting the holder on the support 1 while the upper and lower or end clips constitute a convenient means for securing the map 12 in place, the rod-like portions 2, 5 and 9 serving as a back support for that part of the map which lies between the upper and lower clips.

From the foregoing description, it is thought the complete construction, uses and advantages of the invention will be clear. Some of the advantages are, of course, low cost of manufacture, ease of attachment to steering wheel as the double loop or double clip on the back will snap over the spoke or hook on to most anything for that matter that is not too big.

Furthermore, the road map may be instantly slipped into place or slipped out again as desired.

The invention, it will be seen, is useful in a number of places besides cars to hold maps, cards or advertising matter, and when in the claims I refer to the spokes of the steering wheel I do not wish to have that term construed as a term of limitation as any flat rodlike or thin walled body over which the intermediate clips can be sprung will serve as a support for the holder.

What I claim is:

1. A holder for maps and other similar flat articles formed of wire and comprising an intermediate portion having a pair of connected U-shaped clips for holding over the spoke of a steering wheel, a pair of upper and lower U-shaped clips to receive and hold the map, etc., a connection between one leg of the upper clip and one leg of one of the intermediate clips and another connection between one leg of the lower clip and one leg of the other intermediate clip.

2. A holder for maps and other similar flat articles formed of wire and comprising an intermediate portion having a pair of connected U-shaped clips for holding over the spoke of a steering wheel, a pair of upper and lower U-shaped clips to receive and hold the map, etc., a connection between one leg of the upper clip and one leg of one of the intermediate clips and another connection between one leg of the lower clip and one leg of the other intermediate clip, the connections between said legs of the clips lying in the same plane to serve as a support for that part of the map which is located between the upper and lower clips.

3. A holder for maps and other similar flat articles formed of a continuous piece of wire and comprising an intermediate portion having a pair of connected U-shaped clips for holding over the spoke of a steering wheel, a pair of upper and lower U-shaped clips to receive and hold the map, etc., a connection between one leg of the upper clip and one leg of one of the intermediate clips and another connection between one leg of the lower clip and one leg of the other intermediate clip.

4. A holder for maps and other similar flat articles formed of a continuous piece of wire and comprising an intermediate portion having a pair of connected U-shaped clips for holding over the spoke of a steering wheel, a pair of upper and lower U-shaped clips to receive and hold the map, etc., a connection between one leg of the upper clip and one leg of one of the intermediate clips and another connection between one leg of the lower clip and one leg of the other intermediate clip, the connections between said legs of the clips lying in the same plane to serve as a support for that part of the map which is located between the upper and lower clips.

5. A map holder of spring wire bent intermediate its ends into two parallel laterally spaced clips for holding onto a spoke of a steering wheel and bent adjacent its ends into a pair of map holding clips, the latter pair lying in planes transverse to the planes containing the first mentioned clips.

THOMAS JAMES BRACKETT.